United States Patent
Vikinsky et al.

(10) Patent No.: US 12,539,149 B2
(45) Date of Patent: Feb. 3, 2026

(54) FUSION ROD INSERTION IN PERCUTANEOUS FUSION SURGERY

(71) Applicant: Premia Spine Ltd., Ramat Poleg (IL)

(72) Inventors: Ofer Vikinsky, Zur-Igal (IL); Ilan Lemerovich, Herzliya (IL); Ron Sacher, Herzelia (IL)

(73) Assignee: Premia Spine Ltd., Ramat Poleg (IL)

( * ) Notice: Subject to any disclaimer, the term of this patent is extended or adjusted under 35 U.S.C. 154(b) by 272 days.

(21) Appl. No.: 17/879,939

(22) Filed: Aug. 3, 2022

(65) Prior Publication Data
US 2022/0370102 A1  Nov. 24, 2022

Related U.S. Application Data

(63) Continuation of application No. 16/070,283, filed as application No. PCT/IB2017/050164 on Jan. 12, 2017, now abandoned.

(60) Provisional application No. 62/279,894, filed on Jan. 18, 2016.

(51) Int. Cl.
*A61B 17/70* (2006.01)

(52) U.S. Cl.
CPC ...... *A61B 17/7085* (2013.01); *A61B 17/7023* (2013.01); *A61B 17/7043* (2013.01)

(58) Field of Classification Search
CPC ............ A61B 17/7023; A61B 17/7043; A61B 17/7062–707; A61B 17/7085
See application file for complete search history.

(56) References Cited

U.S. PATENT DOCUMENTS

2007/0073396 A1 * 3/2007 Arnin ................ A61B 17/7031
623/17.11

* cited by examiner

*Primary Examiner* — Nicholas J Plionis
(74) *Attorney, Agent, or Firm* — Dekel Patent Ltd.; David Klein

(57) ABSTRACT

A fusion rod includes mounting structures located at different places thereon, and a first flexible element attached to one of the mounting structures and a second flexible element attached to another of the mounting structures.

3 Claims, 10 Drawing Sheets

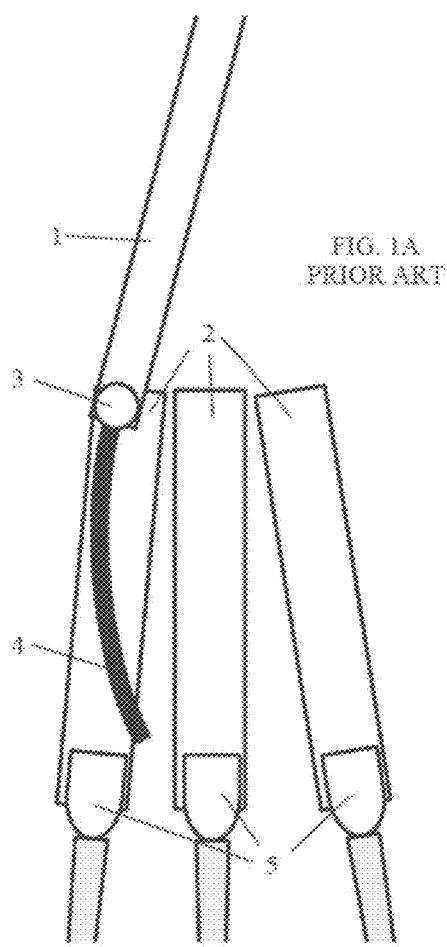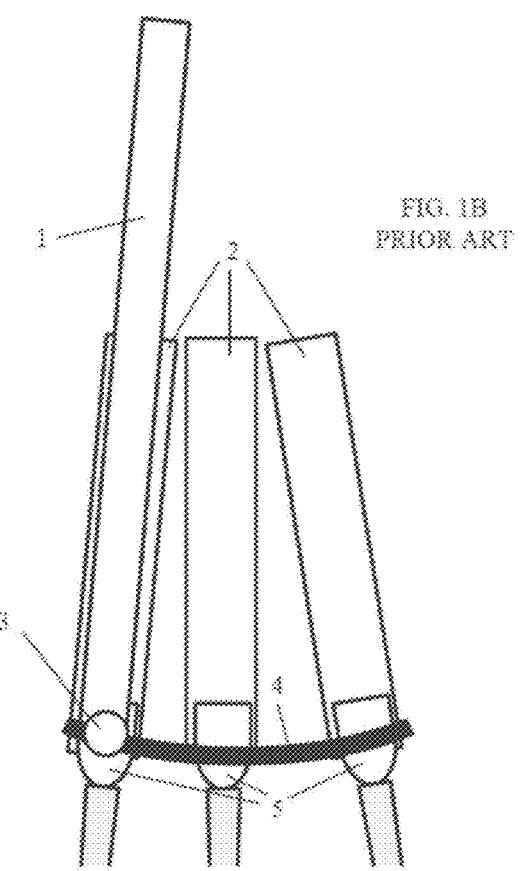
FIG. 1A
PRIOR ART
FIG. 1B
PRIOR ART

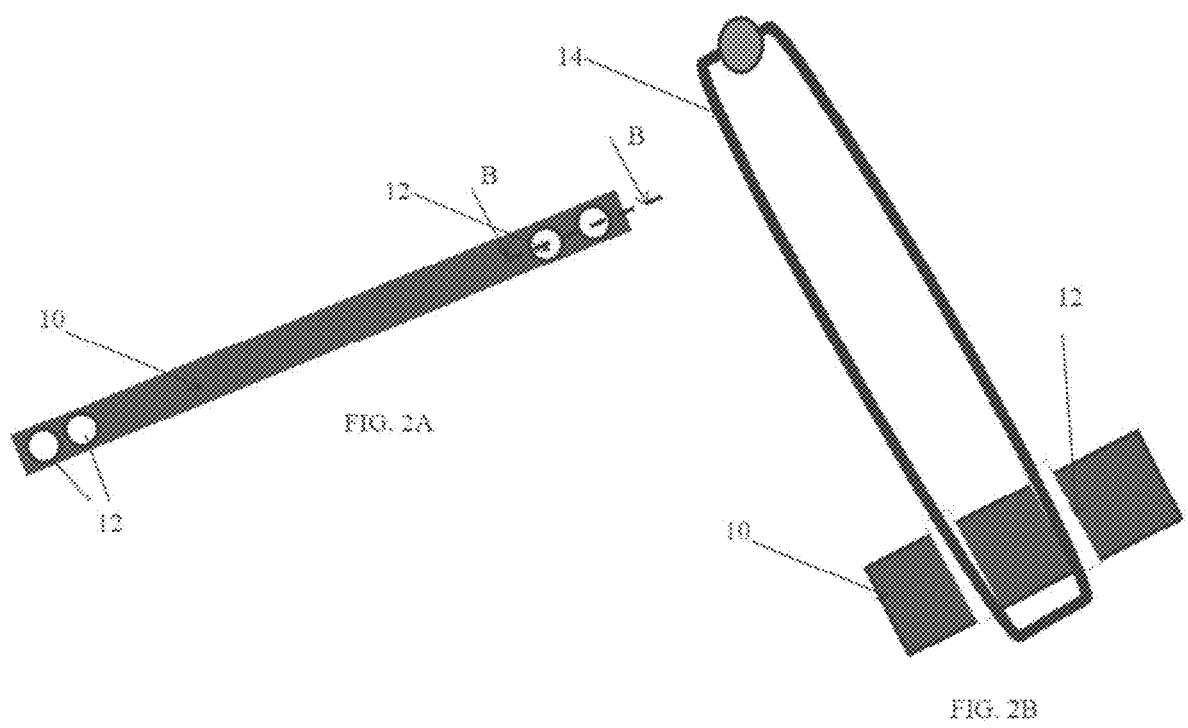

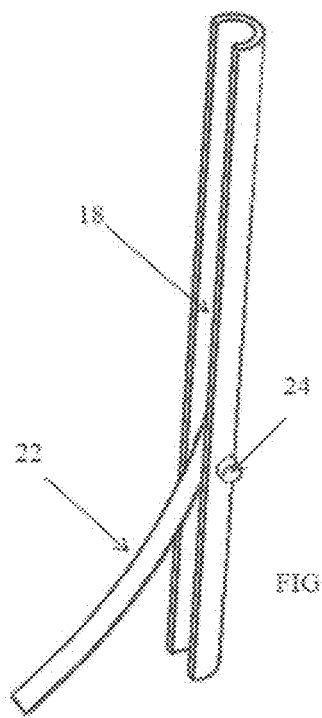 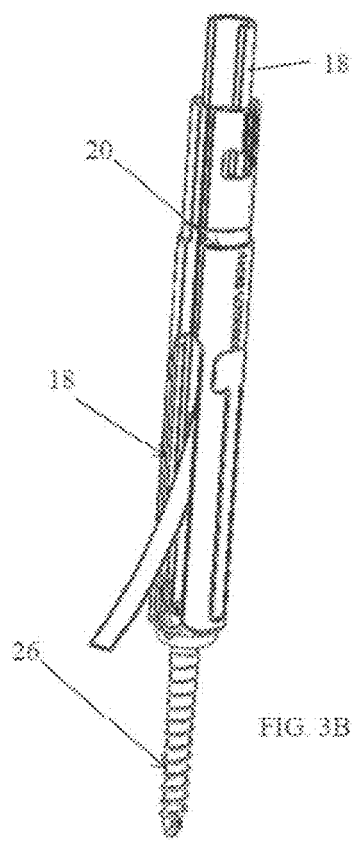
FIG. 3A
FIG. 3B

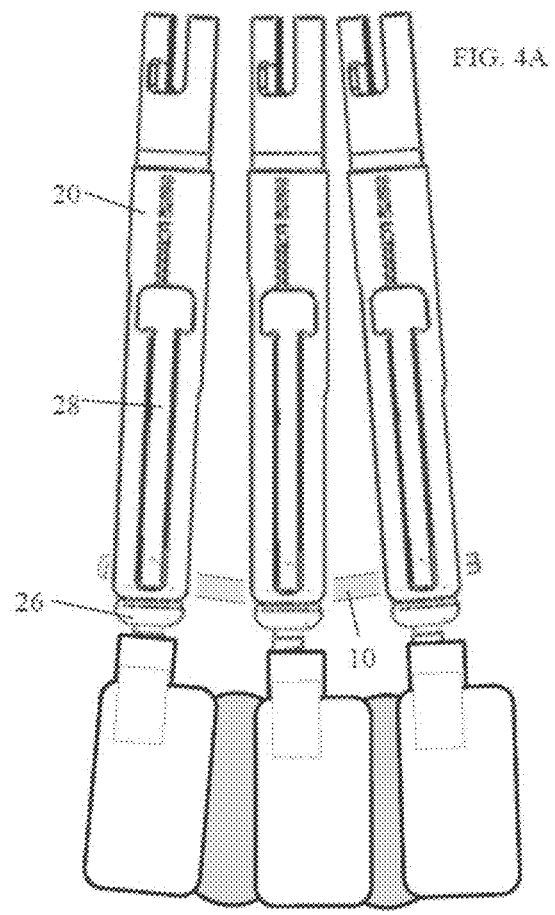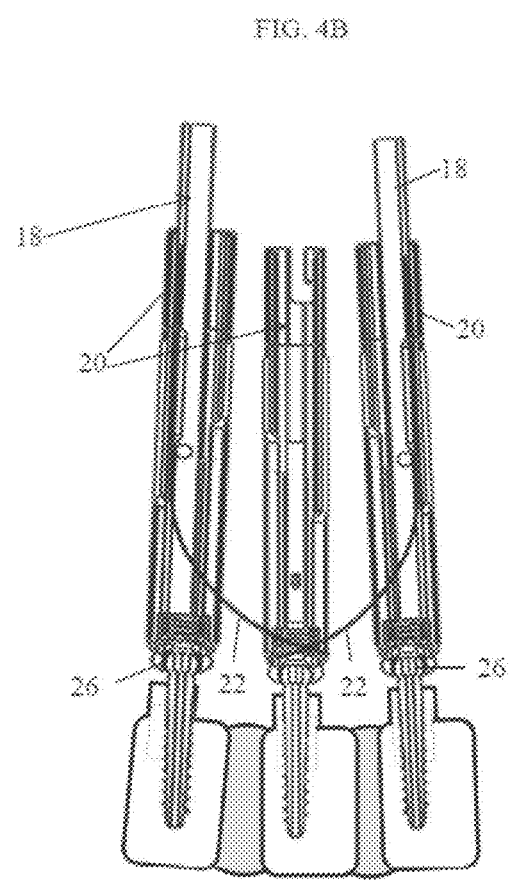

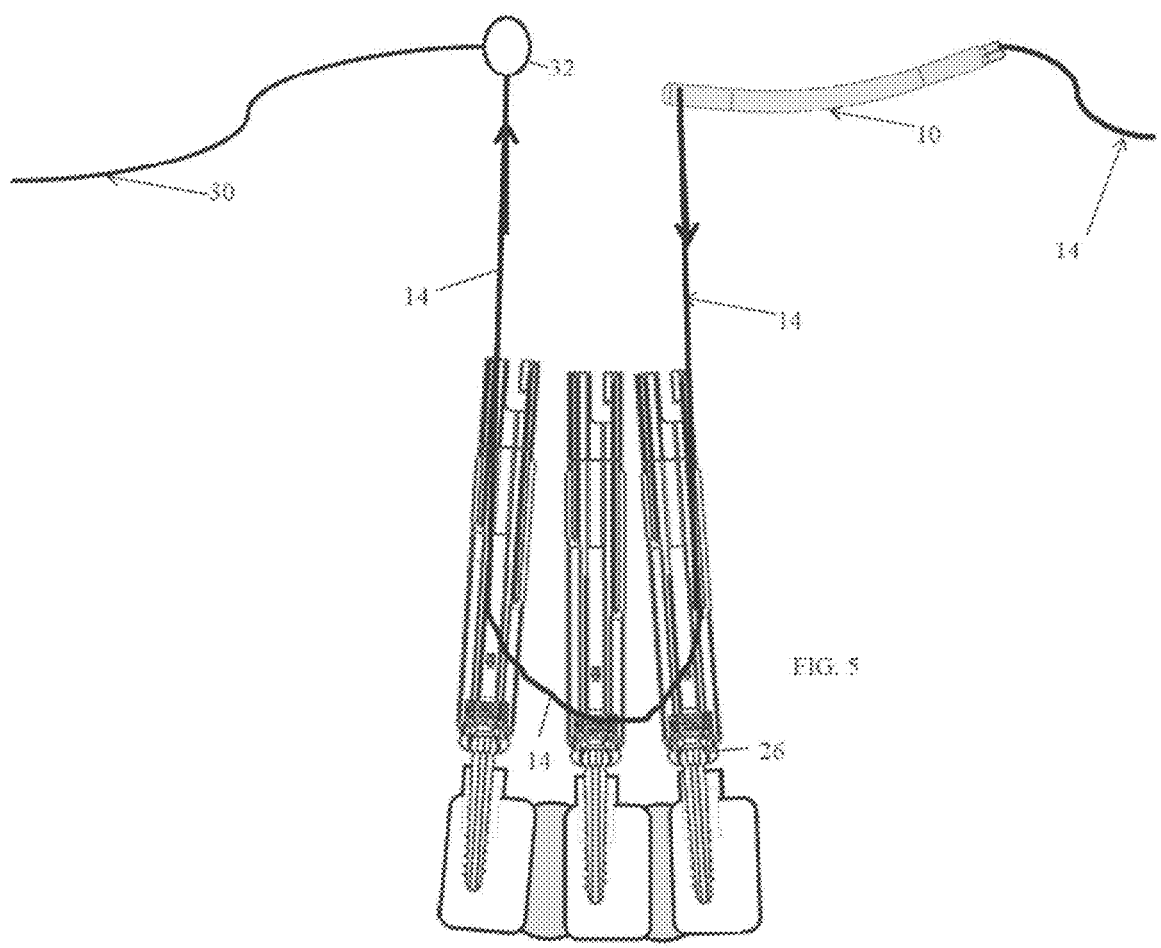

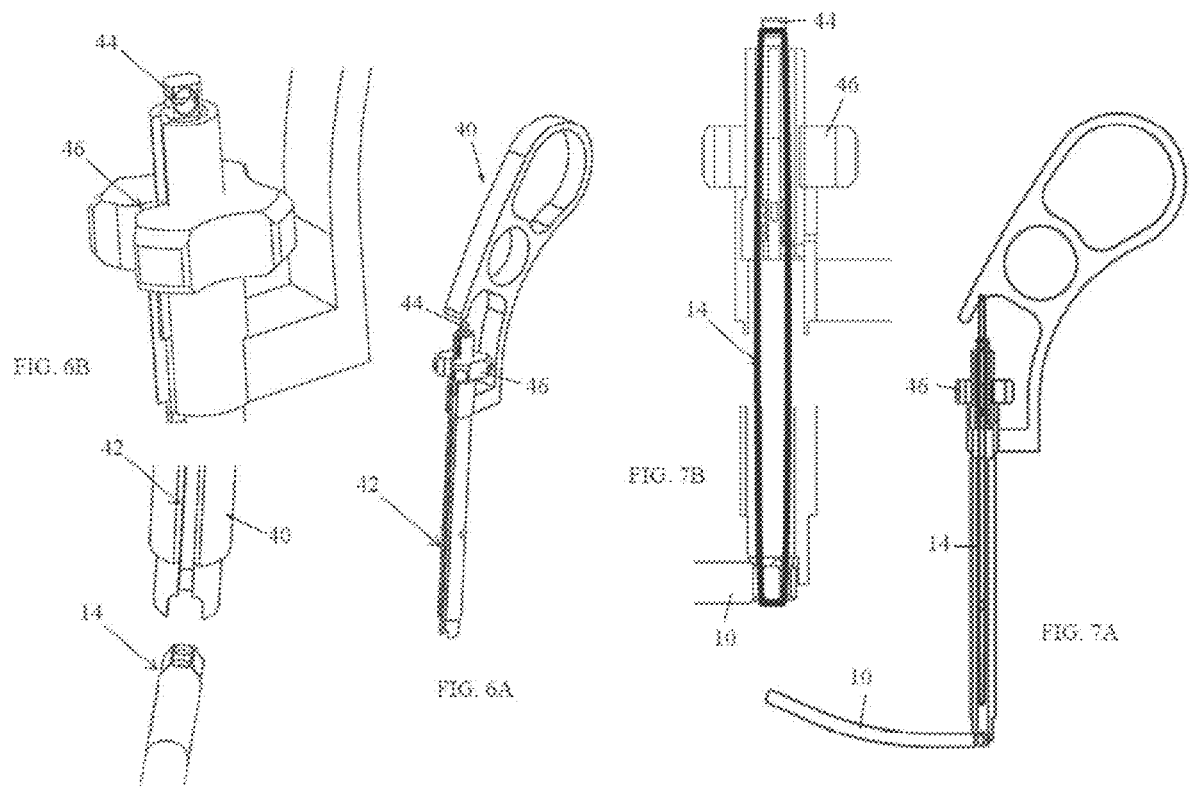

FUSION ROD INSERTION IN PERCUTANEOUS FUSION SURGERY

CROSS-REFERENCE TO OTHER APPLICATIONS

This application claims priority from and is a continuation of U.S. patent application Ser. No. 16/070,283, filed 15 Jul. 2018, which is a national phase application of PCT Patent Application PCT/IB2017/050164, filed 12 Jan. 2017, which claims priority from U.S. Provisional Patent Application 62/279,894, filed 18 Jan. 2016, all the disclosures of which are incorporated herein by reference.

FIELD OF THE INVENTION

The present invention relates generally to percutaneous fusion surgery, and particularly to fusion rod insertion in percutaneous fusion surgery.

BACKGROUND OF THE INVENTION

In percutaneous fusion surgery, pedicle screws are inserted through a small incision into the pedicle. Each pedicle screw is attached to an extension tube (also called towers). The typical tower is a 100-150 mm tube with a quick coupling mechanism at the distal end to allow engagement and disengagement of the tower from the pedicle screw during surgery. The towers create a working tunnel from the tulip (polyaxial head) of the screw to the skin surface to facilitate fusion rod insertion and additional hardware. In addition the towers enable manipulation of the screws such as distraction, spondylogenic compression correction, and sagittal balance restoration as required to achieve the desired clinical outcome. The skin and muscle incision is approximately 20-25 mm long and should optimally be only large enough to accommodate a tower.

Once all the pedicle screws are in place, a fusion rod (such as a bent 6 mm diameter titanium rod) is inserted through the longitudinal slots in the towers into the U-shaped pedicle screw head (also referred as tulip or saddle). The fusion rod is connected to an insertion tool, which allows easy and secure rod insertion.

There are several methods for rod insertion. The more popular methods are either from outside the towers through small incisions or from inside the tower. The tradeoff is between ease of access and simplicity of instrumentation of the "outside" solution versus better soft tissue management and reduced stress on soft tissues in the "inside" approach.

In the "inside" approach, it is particularly difficult to insert a long fusion rod through a tower. FIGS. 1A and 1B illustrate prior art insertion of a fusion rod 4 through heads of pedicle screws 5. The fusion rod 4 is connected to a rotation mechanism 3 located at the distal end of an insertion tool 1. The rotation mechanism 3 is operated from the proximal end of the insertion tool 1 and involves a complicated mechanism. After axial connection of the fusion rod 4 to the insertion tool 1, the fusion rod 4 is inserted through an inner lumen of one of the towers 2. The rod 4 is inserted into the tower 2 and is rotated by rotation mechanism 3 until rod 4 is approximately perpendicular to insertion tool 1.

However, the connection between the insertion tool 1 and the rod 4 is rigid and the rod 4 is pushed into the towers. In the "push" procedure, the rod 4 that can be inserted is limited in length because of the limitation of the rotation joint mechanism 3 and the space inside the tower 2.

SUMMARY OF THE INVENTION

The present invention seeks to provide novel apparatus and methods for fusion rod insertion in percutaneous fusion surgery, as is described more in detail hereinbelow. In one application, the rod is pulled into the tower using a flexible connection, such as wire or strip, rather than pushing it using a rigid connection. The method of the invention easily guides the rod into the longitudinal slot of the tower, thus facilitating fusion rod placement.

There is provided in accordance with an embodiment of the present invention a fusion rod including mounting structures located at different places thereon, and a first flexible element attached to one of the mounting structures and a second flexible element attached to another of the mounting structures. For example, the mounting structures may be holes formed in the fusion rod. The flexible elements may pass through the mounting structures to form loops. Alternatively, the flexible elements may pivotally sit in sockets of the mounting structures.

In accordance with an embodiment of the present invention an insertion guide member is provided that includes a half-tube with an arcuate guide member that has a distal end that curves and protrudes out of the insertion guide member. The arcuate guide member may include a leaf spring. The insertion guide member may be inserted in a pedicle screw tower.

In accordance with an embodiment of the present invention a pair of the insertion guide members may be inserted in pedicle screw towers so that the arcuate guide members form a guiding path for the flexible elements and the fusion rod.

In accordance with an embodiment of the present invention a rod inserter may be attached to one of the flexible elements, wherein tightening or loosening the flexible element with respect to the rod inserter causes the fusion rod to be perpendicular or not perpendicular with respect to a longitudinal axis of the rod inserter.

There is also provided in accordance with an embodiment of the present invention spinal prosthesis including first and second spinal prosthetic members, each of which includes attachment members, including prongs that are fastenable to polyaxial pedicle screws, and central articulating members that allow the first and second spinal prosthetic members to articulate in more than one degree of freedom including rotating about rotation axes parallel to the prongs, wherein the first and second spinal prosthetic members are pivotable about the rotation axes to pivot with respect to one another between expanded and contracted positions.

BRIEF DESCRIPTION OF THE DRAWINGS

The present invention will be understood and appreciated more fully from the following detailed description taken in conjunction with the drawings in which:

FIGS. 1A and 1B are simplified illustrations of prior art insertion of a fusion rod into a tower and through heads of pedicle screws;

FIG. 2A is a simplified pictorial illustration of a fusion rod, constructed and operative in accordance with a non-limiting embodiment of the present invention;

FIGS. 2B and 2C are simplified pictorial illustrations of the fusion rod connected to a flexible element, in accordance with non-limiting embodiments of the present invention;

FIGS. 3A and 3B are simplified pictorial illustrations of an insertion guide member, respectively before and after insertion into a tower, in accordance with non-limiting embodiments of the present invention;

FIG. 4A is a simplified pictorial illustration of towers assembled on pedicle screws, showing open side slots of the towers;

FIGS. 4B and 4C are simplified pictorial illustrations of a pair of insertion guide members installed in towers to form a guiding path for the flexible elements and fusion rod, in accordance with a non-limiting embodiment of the present invention;

FIG. 5 is a simplified pictorial illustration of proceeding to insert the flexible element and fusion rod through the guiding path so that the rod will be installed through the tulips of three pedicle screws, in accordance with a non-limiting embodiment of the present invention;

FIGS. 6A and 6B are simplified pictorial and close-up illustrations, respectively, of a rod insertion tool, in accordance with non-limiting embodiments of the present invention;

FIGS. 7A and 7B are simplified pictorial and close-up illustrations, respectively, of the fusion rod being held perpendicular to the rod insertion tool by means of a tightening element that pulls the flexible element taut and thereby pivots the fusion rod so that it is held perpendicular to the rod insertion tool, in accordance with non-limiting embodiments of the present invention;

FIGS. 8A-8F are simplified pictorial illustrations of a spinal prosthesis, constructed and operative in accordance with an embodiment of the present invention, wherein FIGS. 8A, 8C and 8E illustrate first and second spinal prosthetic members pivoted with respect to each other to expand to an extended position and FIGS. 8B, 8D and 8F illustrate the first and second spinal prosthetic members pivoted to a contracted position, and wherein FIGS. 8A and 8B are perspective views, FIGS. 8C and 8E are front views and FIGS. 8D and 8F are side views.

DETAILED DESCRIPTION OF EMBODIMENTS

Figure 2C:
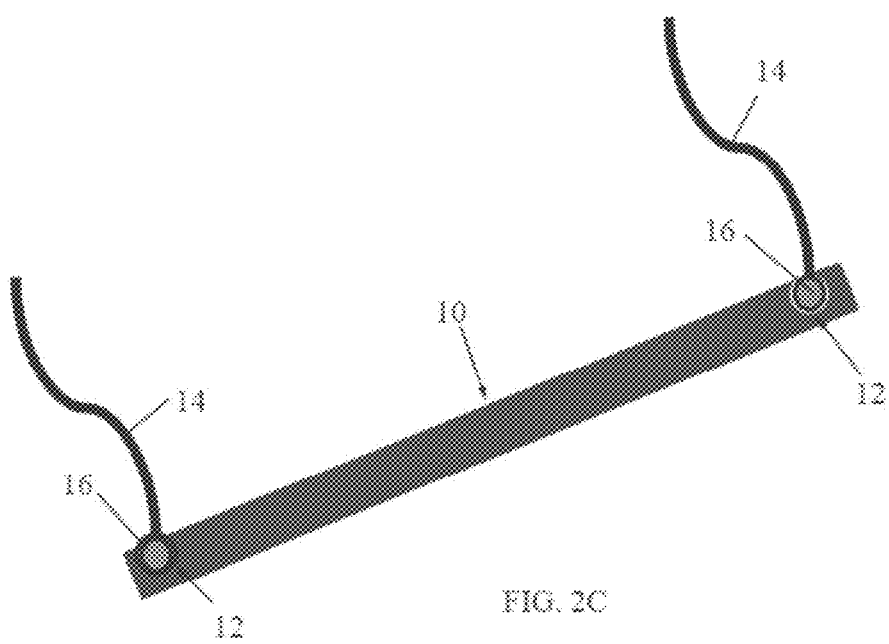

Reference is now made to FIGS. 2A-2C, which illustrate a fusion rod 10, constructed and operative in accordance with a non-limiting embodiment of the present invention. Fusion rod 10 is a modified rod with mounting structure 12 for mounting thereto a flexible element 14 (FIGS. 2B-2C), which may be a flexible wire or strip, for example. The mounting structure 12 may be holes or prongs or any other suitable structure for passing the flexible element 14 therethrough or for tying or otherwise attaching flexible element 14 thereto, for example. In the illustrated embodiment, mounting structure 12 may be holes drilled 2-5 mm from the end of the rod in the area that does not participate in the connection to the pedicle screw nor is fastened by the setscrew of the pedicle attachment.

Reference is now made to FIGS. 2B and 2C. The flexible element 14 may pass through the mounting structure 12 so as to form a loop (FIG. 2B) or may have a spherical end 16 that pivotally sits in a socket mounting structure 12 (FIG. 2C), in which case there is no loop but rather a free, flexible end.

Flexible elements 14 may be connected to opposite ends of fusion rod 10 (i.e., two flexible elements for one rod). The connection can be done in the operation room or supplied pre-packed. The connection may be done in a manner that allows easy disconnection when the rod is in its final position in the towers. At the end of the fusion installation procedure, the flexible elements 14 may be cut or otherwise removed before tightening the set screw on the fusion rod.

Reference is now made to FIGS. 3A and 3B, which illustrate an insertion guide member 18, respectively before and after insertion into a tower 20, in accordance with non-limiting embodiments of the present invention. The insertion guide member 18 may include a half-tube (e.g., the shape of a tube axially cut along its length to form a trough with a U-shaped cross-section) with an arcuate guide member 22 which has a distal end that curves and protrudes out of the insertion guide member 18. The arcuate guide member 22 may be a leaf spring or other suitable member. The arcuate guide member 22 may optionally pivot about a pivot 24. In FIG. 3B, the insertion guide member 18 is inserted in tower 20, which is mounted on a pedicle screw 26.

Reference is now made to FIG. 4A, which illustrates towers 20 assembled on pedicle screws 26, showing open side (longitudinal) slots 28 of the towers 20. (Rod 10 is shown already installed in the pedicle screws.)

Figure 4C:
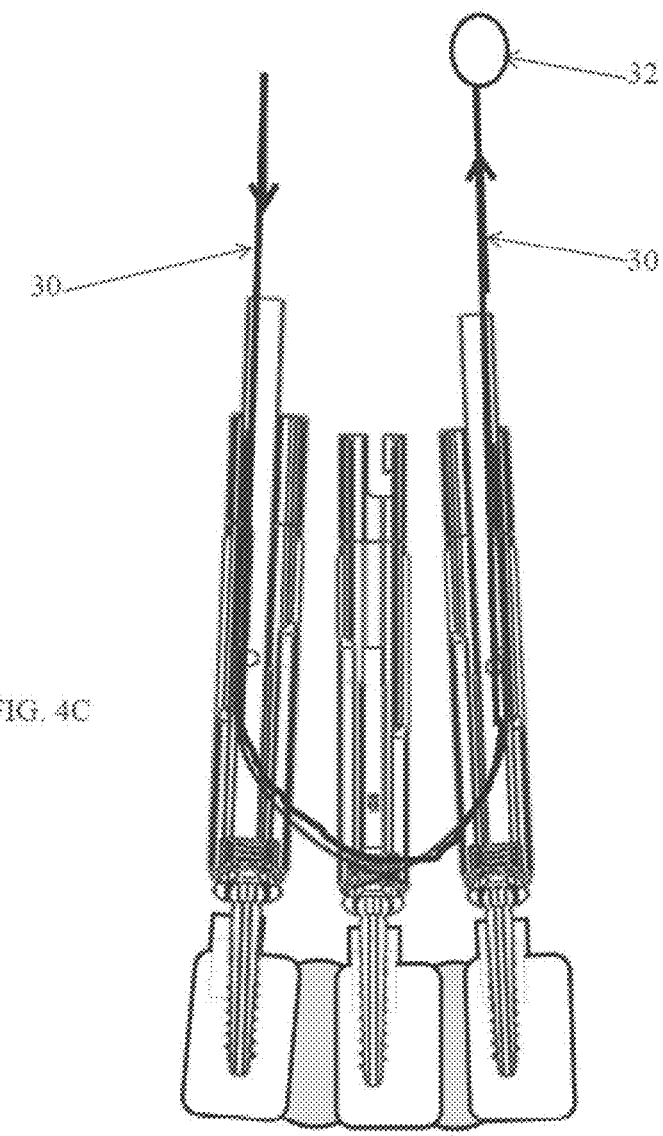

Reference is now made to FIGS. 4B and 4C, which illustrate a pair of insertion guide members 18 installed in towers 20, in which arcuate guide members 22 form a guiding path for the flexible elements and fusion rod, as is now explained.

First, the placement of the screws 26 and attachment of the towers 20 may be performed as in a typical percutaneous approach. All the screws 26 connected to towers 20 may be placed in the pedicles.

Second, as seen in FIG. 4B, the insertion guide members 18 are installed in the caudal and cephalad towers 20 (the two outermost towers in the figures). The insertion guide members 18 are inserted into the towers 20 so that the arcuate guide members 22 face the longitudinal slots 28 of the towers 20. In this manner, the arcuate guide members 22 of the caudal and cephalad insertion guide members 18 meet at the middle tower and create a U-shaped slope, which will be a guiding path for the flexible elements and fusion rod.

Third, as seen in FIG. 4C, a flexible pull strip 30 may be inserted through the guide path. One end of the pull strip 30 is attached to a holding element 32, such as a hook loop or clip of some sort.

The insertion guide members 18 may be removed from the towers 20 at this point, if desired.

Reference is now made to FIG. 5. One end of flexible element 14 may be connected to holding element 32. By pulling pull strip 30, flexible element 14 is pulled through the guiding path. The other end of flexible element 14 is attached to rod 10, so that as flexible element 14 is pulled through the guiding path, rod 10 becomes installed through the tulips of three pedicle screws 26. In other words, the pull strip 30, together with flexible element 14 attached to rod 10, is pulled back into the cephalad tower 20 and out of the caudal tower 20 (or vice versa) to a position where one of the flexible elements 14 connected to the fusion rod 10 passes through all the towers 20. The flexible element 14 attached to the opposite end of rod 10 is attached to a rod inserter 40, which is now described with reference to FIGS. 6A and 6B.

The rod inserter 40 is an instrument designed to hold and insert the fusion rod 10 into the head of the pedicle screw 26. The rod inserter 40 is designed to control the orientation of the fusion rod 10 relative to the inserter 40 to facilitate the rod insertion through the tower.

Figure 7C:
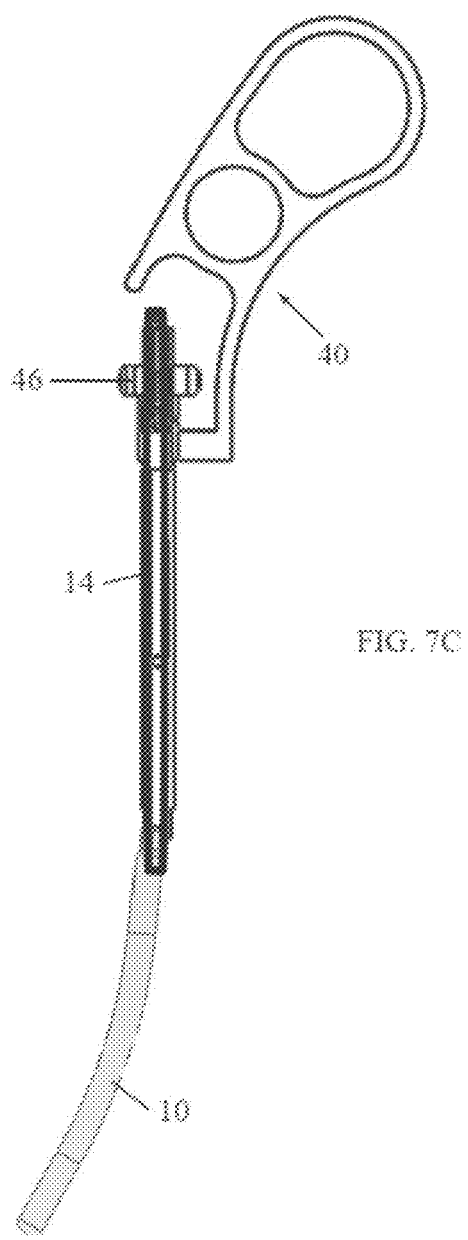
FIG. 7C is a simplified pictorial illustration of loosening the tightening element so that the fusion rod pivots and is not held perpendicular to the rod insertion tool but instead is somewhat collinear with the rod insertion tool, in accordance with non-limiting embodiments of the present invention.

In one non-limiting embodiment, the flexible element 14 connected to fusion rod 10 is a 1.5 mm diameter wire. The flexible element 14 may be passed through a longitudinal slot 42 in the rod inserter body. An end of flexible element 14 may be looped and inserted into a tightening element 44 in the inserter 40 which is located on the proximal end of the inserter 40. Rotation of a tightening knob 46 pulls the tightening element 44 further proximally thus tightening the rod 10 against the inserter body. When the flexible element 14 is fully tightened, the rod 10 is perpendicular to the inserter 40 and provides a rigid connection (FIG. 7A).

When the flexible element 14 is not fully tightened, rod 10 can shift to a position parallel to the inserter body (FIG. 7C) to allow insertion to the tower. By tightening and releasing the tension in the flexible element 14 the position of the rod can be changed to control the rod insertion.

The rod 10 can be pushed and controlled by the inserter 40 and pulled to assist in placing the rod 10 by the flexible element 14 connected to the free end of the rod 10.

The wire/strip 30 can be used as a guide to reattach the inserter or other tool during the procedure. The flexible element 14 can be cut at the end of the procedure and pulled out.

Reference is now made to FIGS. 8A-8F, which illustrate a spinal prosthesis 80, constructed and operative in accordance with an embodiment of the present invention.

Figure 8A:
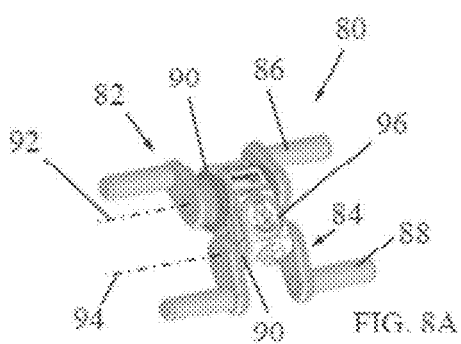
Figure 8B:
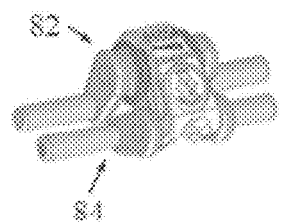

As seen in FIG. 8A, the spinal prosthesis 80 may include a first spinal prosthetic member 82, which may be attached to a first spinal structure, such as but not limited to, a vertebra (e.g., L3 or L4), and a second spinal prosthetic member 84, which may be attached to a second spinal structure, such as but not limited to, a vertebra (e.g., L4 or L5).

The first and second spinal prosthetic members 82 and 84 may respectively include attachment members 86 and 88, such as but not limited to, a pair of rounded prongs that can be fastened to polyaxial pedicle screws, The first and second spinal prosthetic members 82 and 84 may each include central articulating members 90, such as elastomeric cushions or bearings (e.g., roller bearings) that allow first and second spinal prosthetic members 82 and 84 to articulate in more than one degree of freedom. For example, the elastomeric cushions or bearings may permit the first and second spinal prosthetic members 82 and 84 to rotate about and translate along respective rotation axes 92 and 94. Other degrees of movement are also possible such as azimuthal or bending modes of motion. The central articulating members 90 may be housed in a common housing 96.

Figure 8C:
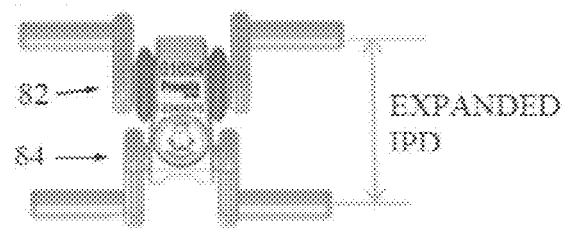
Figure 8D:
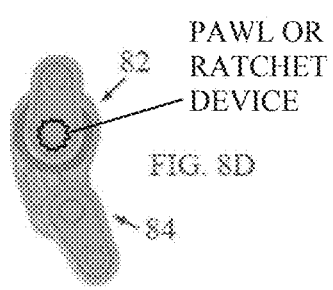
Figure 8E:
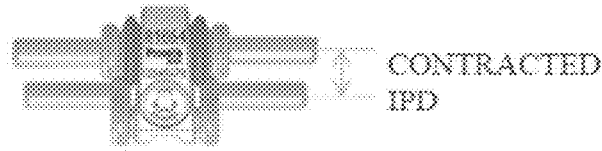
Figure 8F:
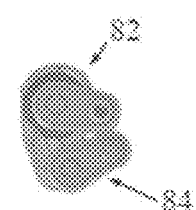

As seen in FIGS. 8A, 8C and 8E, the first and second spinal prosthetic members 82 and 84 can be pivoted with respect to each other about rotation axes 92 and 94 (parallel to the prongs) to expand or stretch outwards to an extended position. Alternatively, seen in FIGS. 8B, 8D and 8F, the first and second spinal prosthetic members 82 and 84 can be pivoted with respect to each other to contract or collapse to a contracted position with a narrow height (e.g., 9 mm). In this manner, the spinal prosthesis 80 can be installed in a small incision in the contracted position for a minimal invasive approach, and then after installation expanded to the expanded position to match any IPD inter-pedicular distance between two vertebrae (e.g., 38 mm). The center of rotation of the implant can be adjusted without changing the screws location or high. For example, the center of rotation of the implant can be adjusted to coincide with the center of rotation of an artificial disc so both implants can work in unison.

Optionally, central articulating members 90 may include a pawl or ratchet device to lock the first and second spinal prosthetic members 82 and 84 at any desired angular orientation.

What is claimed is:

1. A spinal prosthesis comprising:
a common housing formed with first and second through holes;
first and second spinal prosthetic members, each of which comprises attachment members, comprising prongs that are fastenable to polyaxial pedicle screws, and central articulating members that allow said first and second spinal prosthetic members to articulate in more than one degree of freedom while said spinal prosthesis is installed in a patient including rotating about and translating along respective rotation axes, wherein said central articulating members of said first and second spinal prosthetic members respectively pass through said first and second through holes, and said rotation axes of said first and second spinal prosthetic members are respectively central axes of said first and second through holes, wherein said first and second spinal prosthetic members are pivotable about said rotation axes to pivot with respect to one another to expand or stretch outwards to an extended position and to contract or collapse to a contracted position with a narrow height;
and wherein the central articulating members comprise elastomeric cushions or bearings, and wherein said elastomeric cushions or bearings are closer to each other in the contracted position than in the extended position.

2. The spinal prosthesis according to claim 1, wherein movement of said first and second spinal prosthetic members between the extended position and the contracted position does not change locations of the polyaxial pedicle screws.

3. The spinal prosthesis according to claim 1, wherein the central articulating members may include a pawl or ratchet device to lock the first and second spinal prosthetic members at any desired angular orientation.

* * * * *